June 3, 1958     K. BRAND     2,836,961
FILLER MEMBER RETAINING MEANS FOR WHEEL BRAKE CYLINDERS
Filed Nov. 29, 1955
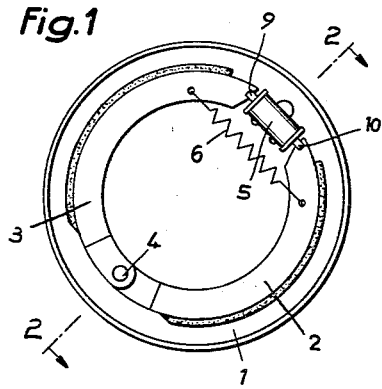
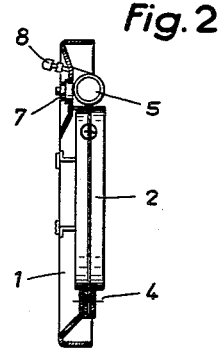
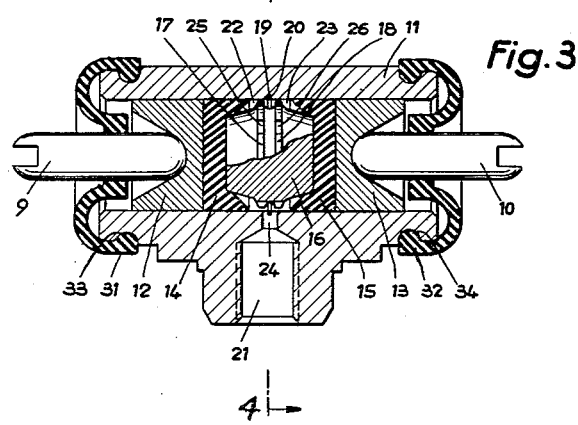
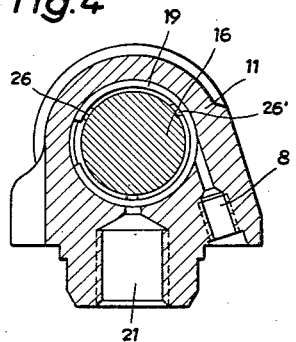
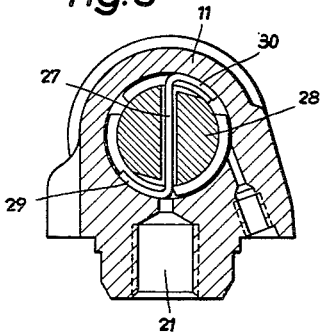
Karl Brand
By Moore & Hall
Attorneys

2,836,961

FILLER MEMBER RETAINING MEANS FOR WHEEL BRAKE CYLINDERS

Karl Brand, Ebern, near Bamberg, Germany, assignor to Schafer Industriegesellschaft Schweinfurt m. b. H., Schweinfurt, Germany Application November 29, 1955, Serial No. 549,780

Claims priority, application Germany December 1, 1954

1 Claim. (Cl. 60—54.6)

The present invention concerns improvements in filler member retaining means in brake devices and cylinders.

It is an object of the invention to provide means to eliminate leakage in hydraulic brakes comprising resilient means.

It is an object of the invention to eliminate the use of threaded means in filler construction between opposed pistons in an hydraulic brake cylinder.

It is an object of the invention to provide means to eliminate leakage and air inclusions in an hydraulic brake cylinder by providing a central peripheral groove in the cylinder wall to receive the ends of an S-shaped spring which passes through a central transverse bore of a filler element, and is held in position by suitable shoulder means on the filler member.

The known filler members have hitherto been positively located within the cylinder body of wheel brake cylinders by means of threaded members extending from the outside into the interior of the cylinder. For example, there has been used a threaded pin extending through the wall of the cylinder body, the free internal end of the threaded pin engaging into a recess formed in the filler members and thus positively locating the filler member within the pressure space of the wheel brake cylinder.

This known construction has a disadvantage in that the threaded means are apt to develop leaks under the influence of the strong vibrations set up during the operation of the vehicle with which the brake system is associated. This in turn is likely to result in a loss of brake fluid and thus to jeopardize the operational safety of the entire brake system.

This disadvantage is eliminated according to the invention by the provision, in the wheel brake cylinders of hydraulically operated brakes, of an externally expanding spring which engages in a suitable groove formed on the inner periphery of the cylinder body. In a preferred embodiment of the invention the said expanding spring may be arranged to be guided between shoulder means provided on the filler member. Furthermore, it is of advantage, according to the invention, to give the said shoulder means a depth such as to cause the said shoulder means to extend beyond the height of the said expanding spring.

Other objects, features and advantages of the present invention will be readily apparent from the following detailed description of a preferred embodiment thereof taken in conjunction with the accompanying drawings, in which:

Figs. 1 and 2 respectively show in plan view and in a cross-sectional view taken along the line 2—2 in Fig. 1 the general arrangement of the brake of a single vehicle wheel;

Fig. 3 is a longitudinal sectional elevation of a wheel brake cylinder;

Figure 4 is one cross-sectional view of the construction of Figure 3, taken along the line 4—4 of Figure 3; and Figure 5 is another cross-sectional view taken along the line 4—4 of Figure 3.

Referring particularly and in greater detail to the drawings, there are shown in Figs. 1 and 2 an annular wheel member 1 carrying the two brake blocks 2 and 3 both of which are pivoted about the fulcrum pin 4. The free ends of the said brake blocks are engageable by the wheel brake cylinder 5, the latter being adapted to spread apart the brake blocks or shoes to apply the brake against the force of a return spring 6. Brake fluid from the master cylinder of the brake system (not shown) is introduced into the wheel brake cylinder 5 through a centering spigot 7. Air is bled from the brake cylinder through a suitable bleeder screw.

Whereas the arrangement of the wheel brake cylinder in brake systems of known construction has been such as to mount the wheel brake cylinder at the highest possible level on the annular wheel member 1, Figs. 1 and 2 illustrate an arrangement in which the wheel brake cylinder is mounted laterally of the highest point on the wheel member. This offers an advantage in that the linkage or piping may be run from above over the brake shoe 3 towards the center of the wheel member 1 without any interference by the wheel brake cylinder.

The internal construction of the wheel brake cylinder shown in Figs. 3, 4 and 5 is such that the two pistons 12 and 13 are slideably movable within the cylinder body 11. It will be seen that piston 12 acts upon push rod 9, while piston 13 acts upon push rod 10. Mounted on the crowns of the pistons 12 and 13 are the sealing cups 14 and 15, respectively. Fig. 3 shows the pistons 12 and 13 in their positions of rest in which the sealing cups 14 and 15 embrace the filler member 16 between them. The filler member 16 has two axially spaced circumferential borders or shoulders 17 and 18. Arranged between the said shoulders is an expansible spring 19 part of which engages in an internal groove formed in the inner wall of the cylinder body, said groove being indicated by the reference numeral 20. The hydraulic pressure fluid is introduced into the wheel brake cylinder through a connecting member (not shown) which can be threadedly engaged in the threaded hole 21.

Upon the pistons 12 and 13 of the wheel brake cylinder being acted upon by the hydraulic fluid forced into the cylinder from the master cylinder (see Figs. 3 and 4), the pistons 12 and 13 will be forced apart and will be moved towards the respective ends of the cylinder. During this action the hydraulic fluid will also act upon the sealing cups 14 and 15 as it pressurizes the annular spaces 22 and 23. The fluid entering into the cylinder body 11 through the passage 24 can also enter into the said annular spaces, since the shoulders 17 and 18 of the filler member 16 have formed therein suitable cut-out portions such as the cut-out portions 25 and 26 particularly shown in Fig. 4.

Regardless of the operative positions of the pistons 12 and 13 and also regardless of the location of the wheel brake cylinder 5 relative to the annular wheel member 1 the expansible spring 19 will always retain the filler member 16 in the position shown in Fig. 3. It will be seen that even though the brake cylinder 5 has its axis inclined relative to the vertical intersecting the center of the wheel member 1, the filler member cannot move from its position in Fig. 3.

Whereas the spring 19 extends along the periphery of the filler member 16 between the shoulders 17 and 18 of the latter, Fig. 5 illustrates a modified embodiment in which an expansible or self-spreading spring 27 extends diametrically through the central portion of the filler member 28, the spring 27 being of substantially S-shaped configuration. In this case the free ends 29 and 30 perform the same function as the circular spring 19 of Figs. 3 and 4. Except for the different configuration of the self-spreading spring 27 and the modified design of the central portion of the filler member 28, the embodiment illustrated in the cross-sectional view of Fig. 5 does not differ from the arrangement of Fig. 4.

It will be noted that the radial height of the shoulders 17 and 18 of the filler member is greater than the radial extent of the spring 19 and of the free ends 29 and 30 of the S-shaped spring 27, the result being that the externally expanding portion or portions of either spring can be fully depressed into the annular space defined by the said shoulders during the insertion of the filler member into the cylinder body 11. As soon as the filler member assumes such a position within the cylinder body 11 that the groove 20 in the cylinder wall is aligned with the space between the shoulders 17 and 18, the flexible portions of the spring 19 or 27 will snap into the said groove and will thus positively locate the filler member 16 axially of the cylinder body 11.

The sealing bellows 31 and 32, which are of per se known design, only serve to prevent any ingress of dirt and moisture into the wheel brake cylinder. Another known feature of the said sealing bellows is their engagement in the annular grooves 33 and 34 of the cylinder body by which they are firmly held in position. During disassembly of the brake cylinder the spring can be caused to be depressed into the space between the shoulders 17 and 18 by the application of an axial thrust force on the filler member 16.

It will be understood that modifications and variations may be effected without departing from the scope of the novel concepts of the present invention.

While there has been disclosed above what is presently believed to be the preferred form of the invention, variations thereof will be obvious to those skilled in the art, and all such changes and variations which fall within the spirit of the invention are intended to be covered by the appended claim.

I claim:

A filler member retaining arrangement for an hydraulically operated brake system for automotive vehicles comprising a braking cylinder having engaging means on an inner wall thereof, a filler member within said cylinder and comprising a body member having a bore therethrough, a substantially S-shaped self-spreading spring having a central portion extending through said bore and ends extending outside said body member, said filler member having a centrally located spaced annular groove for receiving the ends of said spring, said groove being at least as deep as the diameter of the wire comprising said spring, the ends of said spring being engageable by said engaging means on an inner wall of said cylinder whereby leakage of hydraulic fluid is minimized.

References Cited in the file of this patent

UNITED STATES PATENTS

| | | |
|---|---|---|
| 1,786,856 | Madden | Dec. 30, 1930 |
| 2,016,761 | White | Oct. 8, 1935 |
| 2,060,853 | Carroll | Nov. 17, 1936 |
| 2,130,875 | Colman | Sept. 20, 1938 |